(12) United States Patent
Palenius et al.

(10) Patent No.: US 10,284,321 B2
(45) Date of Patent: May 7, 2019

(54) CELL SEARCH IN A COMMUNICATIONS NETWORK

(71) Applicant: Telefonaktiebolaget L M Ericsson (publ), Stockholm (SE)

(72) Inventors: Torgny Palenius, Barseback (SE); Peter Alriksson, Horby (SE); Joakim Axmon, Kavlinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/427,027

(22) PCT Filed: Jan. 28, 2015

(86) PCT No.: PCT/EP2015/051691
§ 371 (c)(1),
(2) Date: Mar. 10, 2015

(87) PCT Pub. No.: WO2016/119838
PCT Pub. Date: Aug. 4, 2016

(65) Prior Publication Data
US 2017/0142641 A1    May 18, 2017

(51) Int. Cl.
*H04J 11/00* (2006.01)
*H04W 48/16* (2009.01)
(Continued)

(52) U.S. Cl.
CPC ....... *H04J 11/0083* (2013.01); *H04J 11/0086* (2013.01); *H04W 48/16* (2013.01);
(Continued)

(58) Field of Classification Search
CPC ..... H04W 48/16; H04W 48/18; H04W 48/20; H04W 72/0453; H04W 72/085; H04J 11/0069; H04J 11/0083; H04J 11/0086
See application file for complete search history.

(56) References Cited

U.S. PATENT DOCUMENTS

| 6,154,500 | A  | * | 11/2000 | Dorenbosch | ............ | H04L 27/10 |
| | | | | | | 370/343 |
| 6,205,334 | B1 | * | 3/2001 | Dent | ..................... | H03J 1/0075 |
| | | | | | | 370/332 |

(Continued)

FOREIGN PATENT DOCUMENTS

EP    2 066 043 A1    6/2009
EP    2 351 431 B1    4/2014
(Continued)

OTHER PUBLICATIONS

PCT International Search Report, dated Oct. 12, 2015, in connection with International Application No. PCT/EP2015/051691, all pages.
(Continued)

*Primary Examiner* — Magdi Elhag
(74) *Attorney, Agent, or Firm* — Leffler Intellectual Property Law, PLLC

(57) ABSTRACT

There is provided a method for cell search in a communications network. The method is performed by a wireless terminal. The method comprises detecting a level of energy received in a frequency interval to be higher than a threshold value. The method comprises acquiring auxiliary information regarding available cells in the frequency interval based on frequency location and width of the frequency interval. The method comprises performing a cell search in at least a sub-band of the frequency interval using the auxiliary information. There is also presented a wireless terminal configured to perform such a method, a computer program, and a computer program product for such a method.

20 Claims, 6 Drawing Sheets

(51) Int. Cl.
*H04W 72/04* (2009.01)
*H04W 72/08* (2009.01)
*H04W 48/18* (2009.01)
*H04W 48/20* (2009.01)

(52) U.S. Cl.
CPC ..... *H04W 72/0453* (2013.01); *H04W 72/085* (2013.01); *H04W 48/18* (2013.01); *H04W 48/20* (2013.01)

(56) References Cited

U.S. PATENT DOCUMENTS

| | | | |
|---|---|---|---|
| 7,096,016 B2* | 8/2006 | Hasegawa | H04B 1/7083 455/161.3 |
| 2003/0236079 A1* | 12/2003 | Hasegawa | H04B 1/7083 455/160.1 |
| 2004/0203839 A1* | 10/2004 | Ostberg | H04W 48/16 455/455 |
| 2006/0030271 A1 | 2/2006 | Ishihara | |
| 2007/0178906 A1* | 8/2007 | Gao | H04W 48/18 455/453 |
| 2009/0137267 A1 | 5/2009 | Nader et al. | |
| 2010/0222056 A1 | 9/2010 | Wu | |
| 2011/0085589 A1 | 4/2011 | Filipovic et al. | |
| 2011/0109811 A1* | 5/2011 | Brandsma | H03J 1/0091 348/732 |
| 2012/0252446 A1 | 10/2012 | Reial et al. | |
| 2014/0038587 A1 | 2/2014 | Murgan et al. | |

FOREIGN PATENT DOCUMENTS

| | | |
|---|---|---|
| WO | 00/31998 A1 | 6/2000 |
| WO | 2004036940 A1 | 4/2004 |
| WO | 2006/061161 A2 | 6/2006 |
| WO | 2007/042424 A1 | 4/2007 |
| WO | 2008/107264 A1 | 9/2008 |
| WO | 2014/168539 A1 | 10/2014 |

OTHER PUBLICATIONS

Qualcomm Incorporated "Basestation Emission Requirements" R4-146501, 3GPP TSG-RAN WG4 #72bis, Oct. 6-10, 2014, Singapore, SG, pp. 1-3.
Qualcomm Incorporated "Performance requirement for intra-band contiguous CA with minimum channel spacing" R4-146924, 3GPP TSG-RAN WG4 #73, Nov. 17-21, 2014, San Francisco, US, pp. 1-3.
International Preliminary Report on Patentability, dated Aug. 1, 2017, in connection with International Application No. PCT/EP2015/051691, 8 pages.

* cited by examiner

CELL SEARCH IN A COMMUNICATIONS NETWORK

TECHNICAL FIELD

Embodiments presented herein relate to communications networks, and particularly to a method, a wireless terminal, a computer program, and a computer program product for cell search in a communications network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability of a wireless terminal to find a cell in the communications network to camp on. This is achieved by the wireless terminal performing a cell search. The cell search is typically performed when the wireless terminal is powered up, or after having been in so-called flight mode.

The wireless terminal preferably camps on a cell belonging to the correct network, its home public land mobile network (PLMN). When the wireless terminal starts its cell search for a cell in the communications network to camp on, it typically performs steps as summarized next. The wireless terminal performs a cell search using carrier frequencies stored in a history list. If no cell corresponding to these carrier frequencies is found, the wireless terminal continues its cell search by scanning the available frequency bands to find any cell. When a cell is found the wireless terminal reads the system information to check whether it is a home PLMN or otherwise if the wireless terminal anyway is allowed to camp on the cell. This procedure is continued until a cell is on which the wireless terminal is allowed to camp on is found.

There are many ways for the wireless terminal to scan the available frequency bands to find a cell. For wireless terminals supporting the Global System for Mobile Communications (GSM) and/or Wideband Code Division Multiple Access (WCDMA) based communications networks the wireless terminal performs measurements in those frequency bands where energy is received. Then the wireless terminal searches at every defined carrier frequency when the received energy (such as the received signal strength indicator, RSSI) is higher than a threshold.

With wireless terminals also supporting Long-Term Evolution (LTE) based communications networks need to support more and wider frequency bands, the above summarized cell search procedure becomes lengthy in time. For example, LTE Band 1 contains almost 600 carrier frequencies. If each search takes 1 second, this band and RAT alone takes many minutes.

It has therefore been suggested, see EP2351431 and EP2066043, that the wireless terminal is configured to search for a cell with a nominal spectral shape in the frequency band. In general terms, the spectral shape may be unique for each radio access technology (RAT). That is, each RAT may have cells with its own spectral shape. For example, the wireless terminal may search for cells with the spectral shape of LTE and using different bandwidths (such as 1.4, 3, 5, 10, 15 and 20 MHz) in order to estimate carrier frequencies where the cell search should be performed. In general terms, EP2351431 and EP2066043 propose to during the cell search use a filter (similar to a matched filter) adapted to the spectral shape of the searched RAT and bandwidth. The proposed cell search efficiently finds cells where the spectra are easy to distinguish from each other. One such example is schematically illustrated in FIG. 7. FIG. 7 schematically illustrates a spectrum 71 comprising three LTE cells 72a, 72b, 72c each with 10 MHz bandwidth and placed 10 MHz apart. Here the cell search procedure as disclosed in EP2351431 and EP2066043 works fine and identifies the three carries 73a, 73b, 73c (illustrated as peaks 74a, 74b, 74c having a probability close to 1), where three LTE cells with a bandwidth of 10 MHz and a nominal distance of 10 MHz are shown with center frequency locations 75a, 75b, 75c.

However, when the carriers are pushed closer to each other, e.g. to 9.0 MHz so there is no gap at all between the spectra of the three different cells, as schematically illustrated in the example of FIG. 8, where center frequency locations 85a, 85b, 85c of three 10 MHz cells are shown, the cell search procedure as disclosed EP2351431 and EP2066043 interprets the spectrum 81 as comprising one continuous 30 MHz cell and thus finds only one potential cell in the frequency band 82 but fails to correctly find any center frequency locations, and thus fails to find a cell to camp on. One potential carrier 83 is found, but this carrier is determined to have a probability close to zero, as illustrated by the peak 84. In more detail, the cell search procedure detects that there is power, but in this case determines the frequency band 82 to be a continuous 30 MHz spectra, hence not corresponding to a nominal spectral shape and thus no cell to camp on is found.

Furthermore the spectra of the different cells may overlap even more in frequency, causing the received spectra to deviate even more from the nominal shape. Additionally, with multipath propagation the spectrum is corrupted even further, thus making the situation even worse.

Hence, there is still a need for an improved cell search in a communications network.

SUMMARY

An object of embodiments herein is to provide efficient cell search in a communications network.

According to a first aspect there is presented a method for cell search in a communications network. The method is performed by a wireless terminal. The method comprises detecting a level of energy received in a frequency interval to be higher than a threshold value. The method comprises acquiring auxiliary information regarding available cells in the frequency interval based on frequency location and width of the frequency interval. The method comprises performing a cell search in at least a sub-band of the frequency interval using the auxiliary information.

Advantageously this provides efficient cell search in a communications network.

Advantageously this enables quick and power efficient spectrum shape matching.

Advantageously, the proposed cell search may combine quick and power efficient spectrum shape matching with a more robust, but slower and more power consuming, legacy exhaustive search approach.

Advantageously, if the wireless terminal cannot find any cell with the legacy search approach, but still power is detected in the received frequency bands, the proposed cell search provides a systematic way of identifying cells, even if the shape of spectrum does not fit the nominal one.

Advantageously, this may enable the wireless terminal to quickly find a cell to camp on for nominal channel placements but still handle scenarios with tightly packed, or even overlapping, carriers.

Advantageously, once a cell has been visited on any of its carriers, the carriers may be stored in the wireless terminal. Hence, frequent power-consuming deep searches may thereby be avoided once a new cell search is to be performed.

According to a second aspect there is presented a wireless terminal for cell search in a communications network. The wireless terminal comprises a processing unit. The processing unit is configured to cause the wireless terminal to detect a level of energy received in a frequency interval to be higher than a threshold value. The processing unit is configured to cause the wireless terminal to acquire auxiliary information regarding available cells in the frequency interval based on frequency location and width of the frequency interval. The processing unit is configured to cause the wireless terminal to perform a cell search in at least a sub-band of the frequency interval using the auxiliary information.

According to a third aspect there is presented a computer program for cell search in a communications network, the computer program comprising computer program code which, when run on a processing unit of a wireless terminal, causes the wireless terminal to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
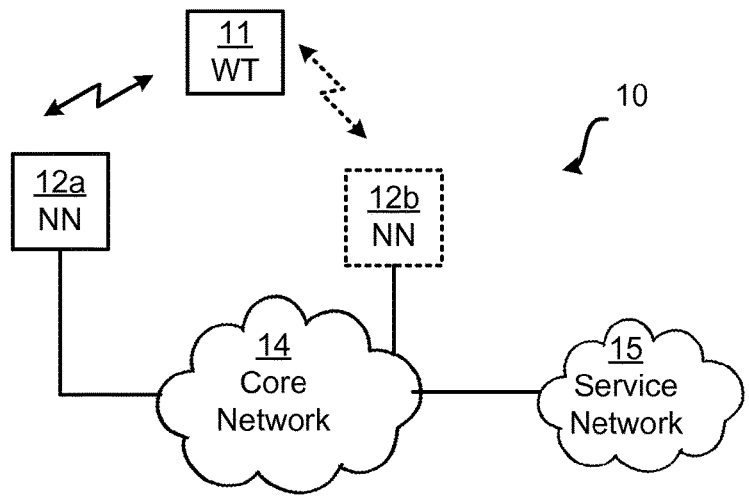
FIG. 1 is a schematic diagram illustrating a communication network according to embodiments.

FIG. 1 is a schematic diagram illustrating a communications network 10 where embodiments presented herein can be applied. The communications network 10 comprises network nodes 12a, 12b. Each network node 12a, 12b provides one or more cells for a wireless terminal 11 to camp on. The network nodes 12a, 12b are operatively connected to a core network 14 which, in turn, is operatively connected to a service network 15. A wireless terminal 11 camping on a cell of one of the network nodes 12a, 12b may thereby be able to access content and services as provided by the service network 15. As herein defined a cell is in the frequency domain represented by one or more carriers. Thus, cells available in a frequency interval may be expressed as carriers present in a frequency interval.

The network nodes 12a, 12b may be provided as any combination of radio access network nodes such as radio base stations, base transceiver stations, node Bs, and evolved node Bs. The wireless terminal 11 may be provided as a portable wireless device such as a mobile station, a mobile phone, a handset, a wireless local loop phone, a user equipment (UE), a smartphone, a laptop computer, a tablet computer, or a wireless sensor device.

As noted above, the wireless terminal when being powered up, or when having so-called flight mode switched off, performs a cell search. The embodiments disclosed herein address efficient cell selection procedures for scenarios with tightly packed or even overlapping cells in the frequency domain.

The embodiments disclosed herein relate to cell search in a communications network 10. In order to obtain such cell search there is provided a wireless terminal 11, a method performed by the wireless terminal 11, a computer program comprising code, for example in the form of a computer program product, that when run on a processing unit of the wireless terminal, causes the wireless terminal to perform the method.

Figure 2A:
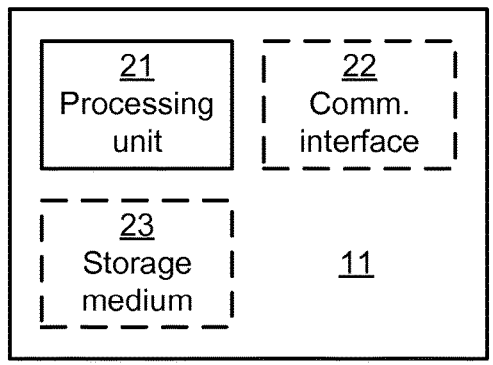
FIG. 2a is a schematic diagram showing functional units of a wireless terminal according to an embodiment.

FIG. 2a schematically illustrates, in terms of a number of functional units, the components of a wireless terminal 11 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The wireless terminal 11 may further comprise a communications interface 22 for communications with at least one network node 12a, 12b. As such the communications interface 22 may comprise one or more transmitters and receivers, comprising analogue and digital components and a suitable number of antennas for wireless communications. The processing unit 21 controls the general operation of the wireless terminal 11 e.g. by sending data and control signals to the communications interface 22 and the storage medium 23, by receiving data and reports from the communications interface 22, and by retrieving data and instructions from the storage medium 23. Other components, as well as the related functionality, of the wireless terminal 11 are omitted in order not to obscure the concepts presented herein.

Figure 2B:
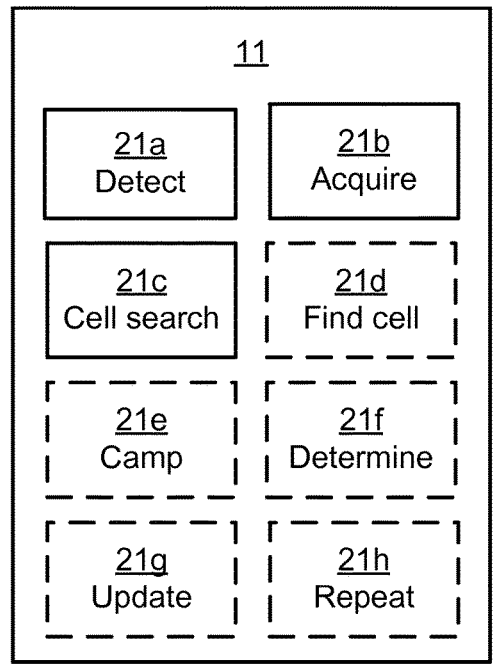
FIG. 2b is a schematic diagram showing functional modules of a wireless terminal according to an embodiment.

FIG. 2b schematically illustrates, in terms of a number of functional modules, the components of a wireless terminal 11 according to an embodiment. The wireless terminal 11 of FIG. 2b comprises a number of functional modules; a detect module 21a configured to perform below step S104, an acquire module 21b configured to perform below steps S106, S108h, and a cell search module 21c configured to perform below steps S108, S108a, S108b. The wireless terminal 11 of FIG. 2b may further comprises a number of optional functional modules, such as any of a find cell module 21d configured to perform below step S108c, a camp module 21e configured to perform below step S108d, a determine module 21f configured to perform below step S108e, an update module 21g configured to perform below step S108f, and a repeat module 21h configured to perform below steps S108g, S108j. The functionality of each functional module 21a-h will be further disclosed below in the context of which the functional modules 21a-h may be used. In general terms, each functional module 21a-h may be implemented in hardware or in software. Preferably, one or more or all functional modules 21a-h may be implemented by the processing unit 21, possibly in cooperation with functional units 22 and/or 23. The processing unit 21 may thus be arranged to from the storage medium 23 fetch instructions as provided by a functional module 21a-h and to execute these instructions, thereby performing any steps as will be disclosed hereinafter.

Figure 3:
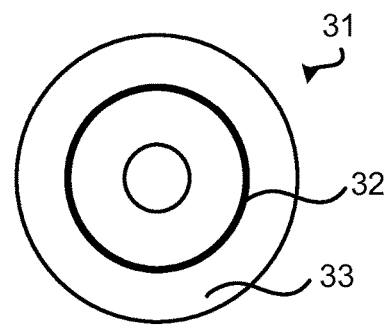
FIG. 3 shows one example of a computer program product comprising computer readable means according to an embodiment.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 4:
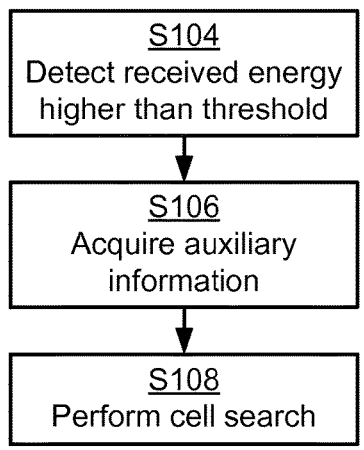
FIGS. 4, 5, and 6 are flowcharts of methods according to embodiments.
Figure 5:
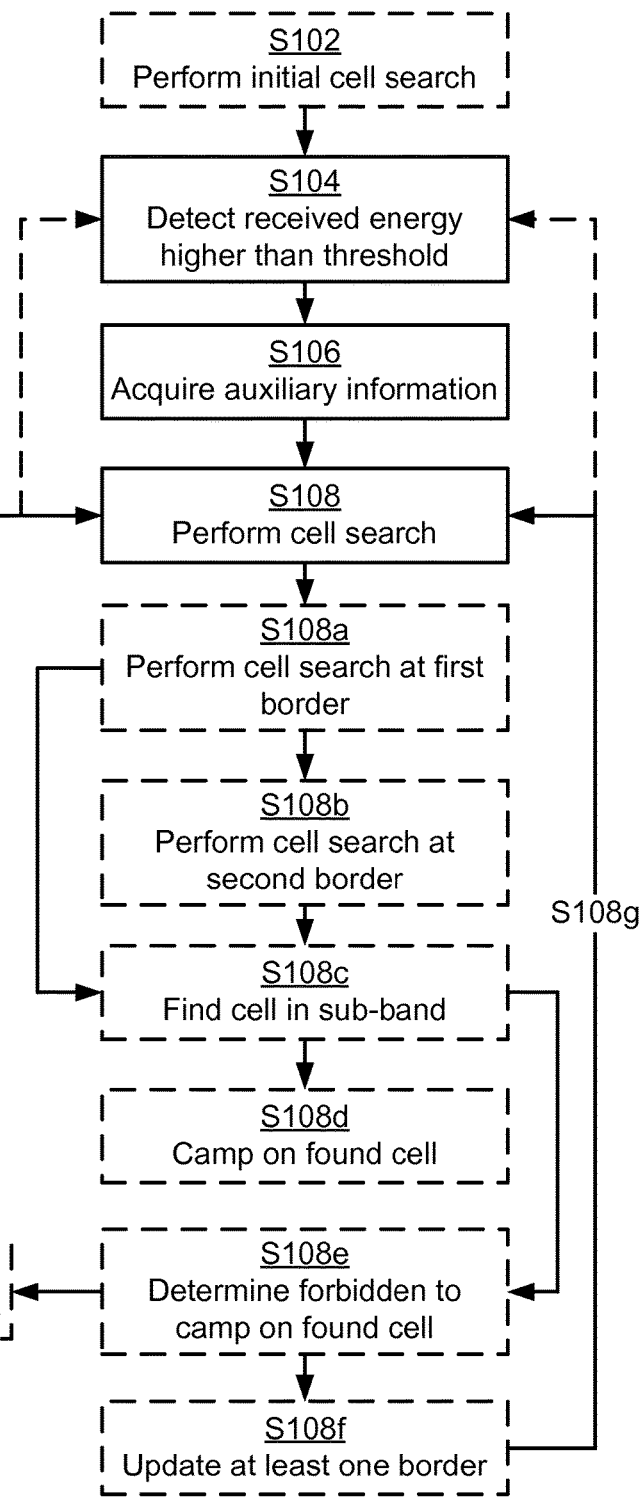
Figure 6A:
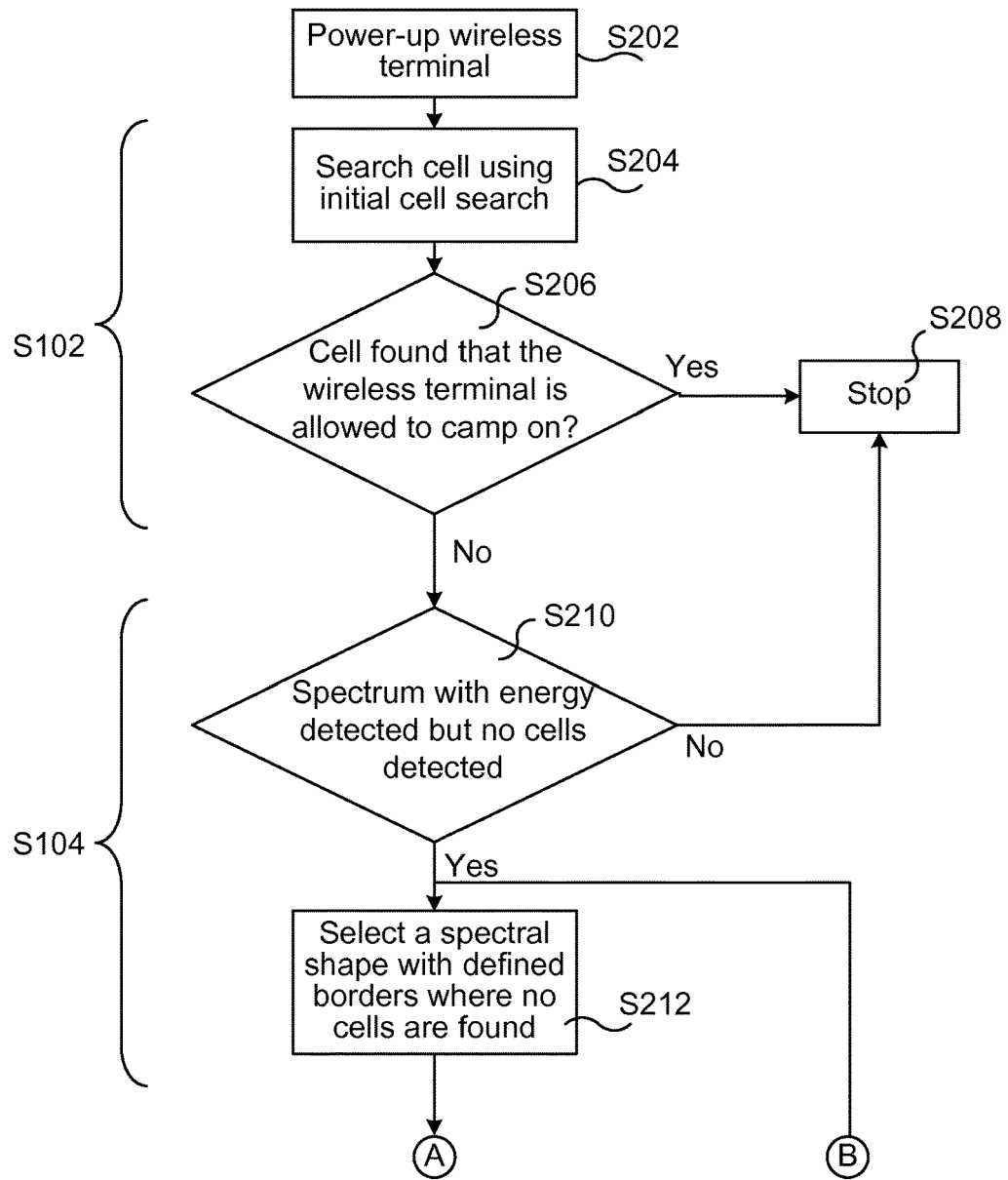
Figure 6B:
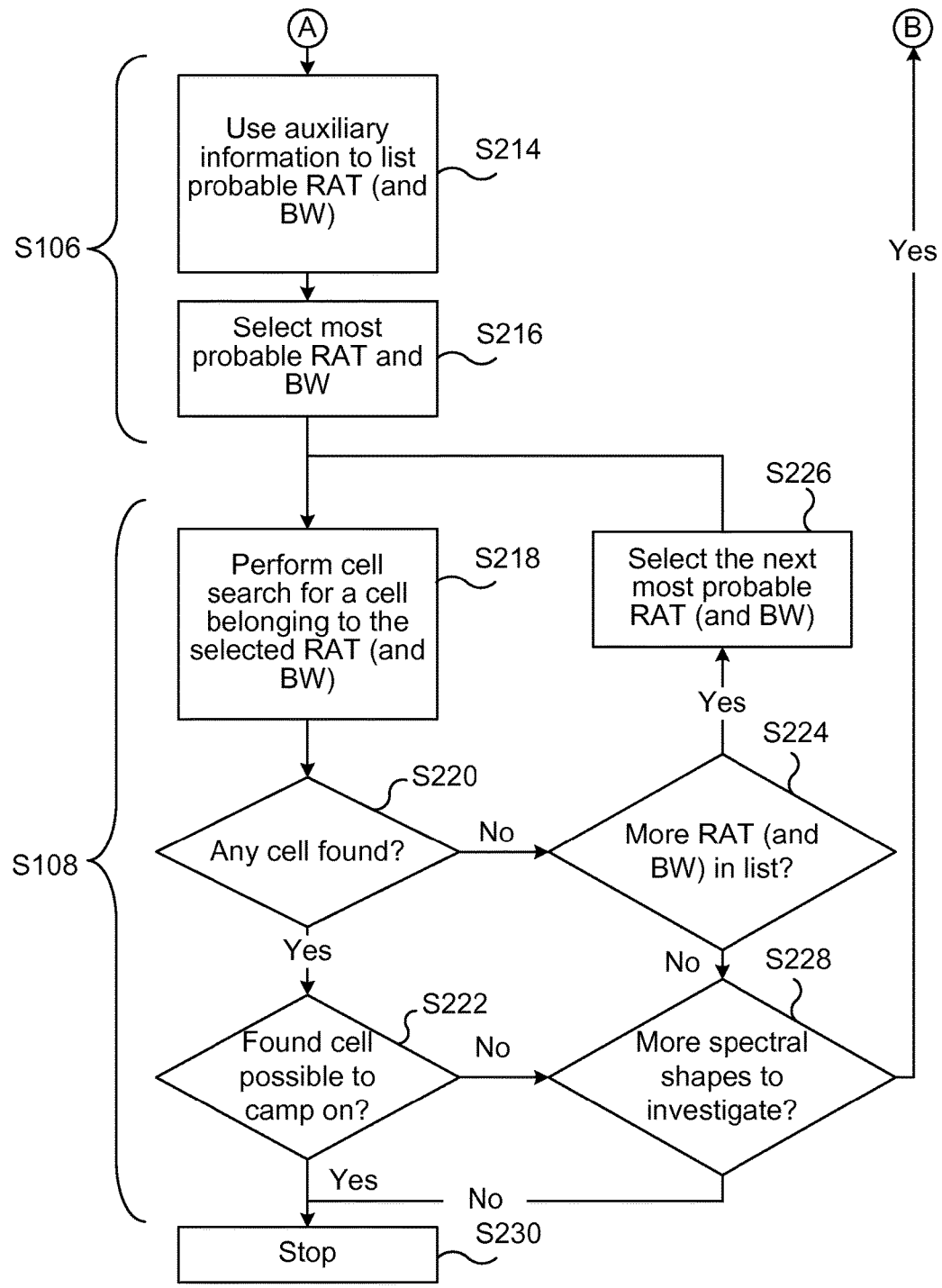
Figure 7:
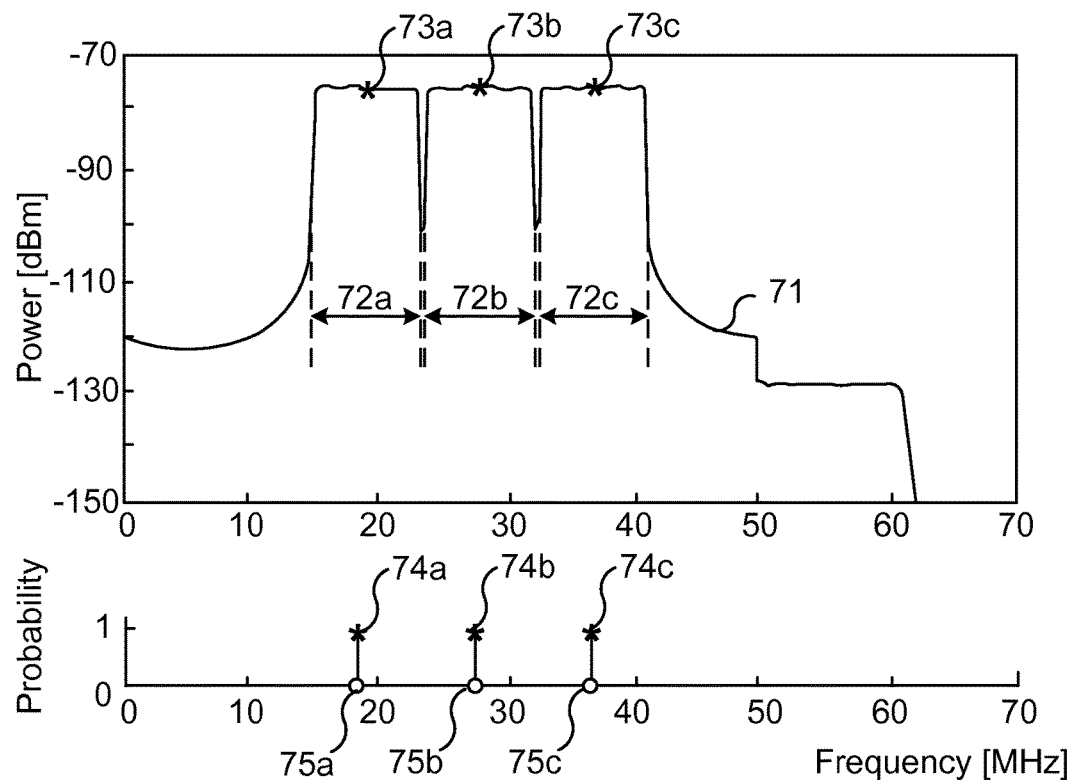
FIG. 7 schematically illustrates received energy as a function of frequency according to a first example.
Figure 8:
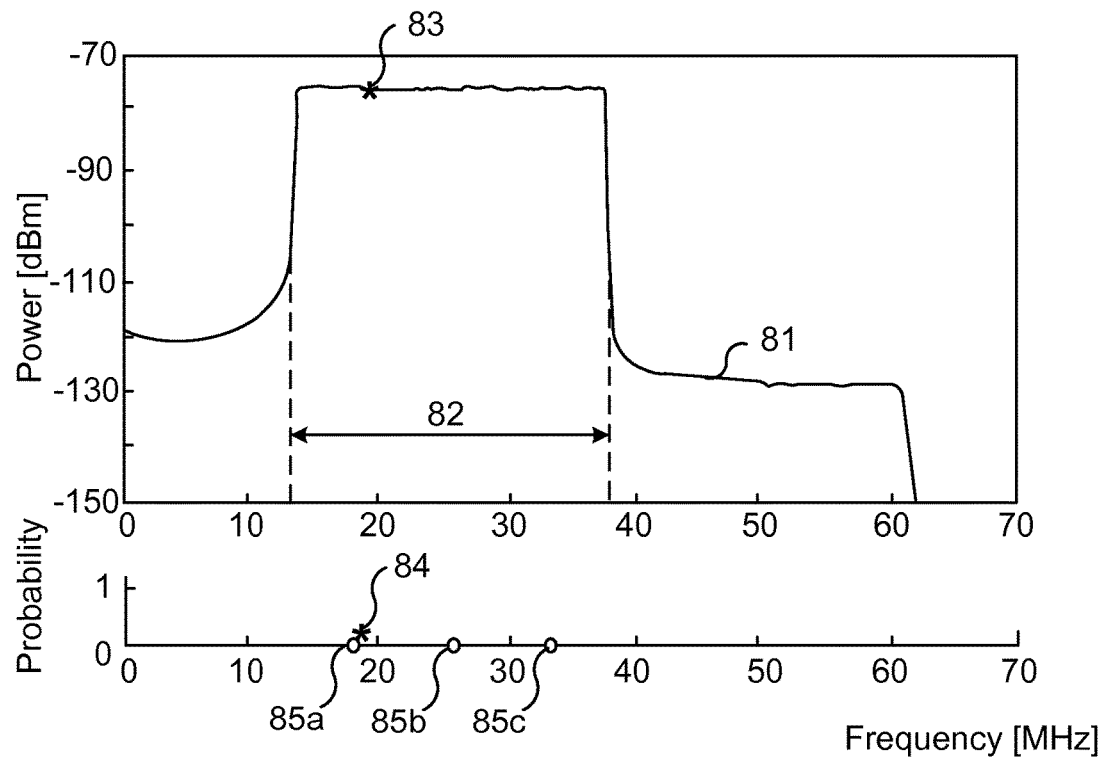
FIG. 8 schematically illustrates received energy as a function of frequency according to a second example.

FIGS. 4, 5 and 6 are flow chart illustrating embodiments of methods for cell search in a communications network 10. The methods are performed by the wireless terminal 11. The methods are advantageously provided as computer programs 32.

Reference is now made to FIG. 4 illustrating a method for cell search in a communications network 10 as performed by a wireless terminal 11 according to an embodiment.

The proposed cell search is based on the wireless terminal 11 evaluating a frequency interval for determining whether or not a carrier frequency of a cell is present in the frequency interval. In order to determine in which frequency interval to search for the cell the frequency interval must be limited. The wireless terminal 11 is therefore configured to, in a step S104, detect a level of energy received in a frequency interval to be higher than a threshold value. Hence, the threshold value may be set to determine what level of energy is needed in order to perform a cell search on the thus defined frequency interval.

Once the frequency interval in which cell search is to be performed has been determined the wireless terminal 11 accesses information which can be used in order to find a cell, i.e., a carrier frequency, in the frequency interval. Particularly, the wireless terminal 11 is configured to, in a step S106, acquire auxiliary information regarding available cells in the frequency interval based on frequency location and width of the frequency interval.

A cell search is then performed in the frequency interval using the acquired auxiliary information. Hence, the wireless terminal 11 is configured to, in a step S108, perform a cell search in at least a sub-band of the frequency interval using the auxiliary information.

Hence, the cell search involves to evaluate frequencies for presence of a cell to camp on within the spectra (i.e., within the frequency interval) regardless if its shape fits any stored modulation spectra. The spectrum shape of the searched frequency interval may consist of several cells that are overlapping in frequency and thus it may be difficult to estimate the carrier frequency and radio access technology of one specific cell based only on the shape of the spectrum.

In the case when there is received energy within the frequency interval the wireless terminal 11 may utilize the auxiliary information (e.g., to rank RATs and bandwidths, see below) in order to determine how likely a cell is to be present in the searched frequency interval. As will be further disclosed with reference to be below embodiments, the wireless terminal 11 may then performs cell search only on the selected RAT at a carrier frequency so that the modulation bandwidth just fits within the detected spectrum.

Embodiments relating to further details of cell search in a communications network 10 as performed by a wireless terminal will now be disclosed.

The frequency interval as a whole may fail to match a spectrum of a cell. Hence, steps S106 and S108 may only be performed in scenarios where it in step S104 has been determined that the frequency interval (as determined by the threshold value) fails to match a spectrum of a cell. For example, and as will be further disclosed below, according to some embodiments, steps S106 and S108 may only be performed in scenarios where an initial cell search procedure has failed to identify a cell.

There may be different examples of auxiliary information and ways for the wireless terminal 11 to utilize the auxiliary information. Different embodiments relating thereto will now be described in turn.

One example of the auxiliary information is related to different radio access technologies (RATs) used. That is, according to an embodiment the auxiliary information comprises identities of RATs. The identities may be provided in a prioritized list. Hence, the wireless terminal 11 may be enabled to configure its cell search in step S108 to be based on which RAT is assumed to be used by a cell in the searched frequency interval. For example, if the RAT is LTE, the wireless terminal 11 may only search for LTE cells, and thus only listen for LTE signals, in the searched frequency interval.

Another example of auxiliary information is related to the bandwidth (BW) of the RATs. That is, according to an embodiment the auxiliary information further comprises identities of BWs used by cells of the RATs. Hence, the wireless terminal 11 may be enabled to configure its cell search in step S108 to be based on which BW is assumed to be used by a cell in the searched frequency interval.

As noted above, the searched frequency interval is defined by a level of energy received in the frequency interval being higher than a threshold value. In general terms the frequency interval is confined within a first border and a second border. The first border may be placed lower in frequency than the second border. Alternatively, the first border is placed higher in frequency than the second border.

There may be different ways to define the first border and the second border of this frequency interval. Different embodiments relating thereto will now be described in turn.

Figure 9:
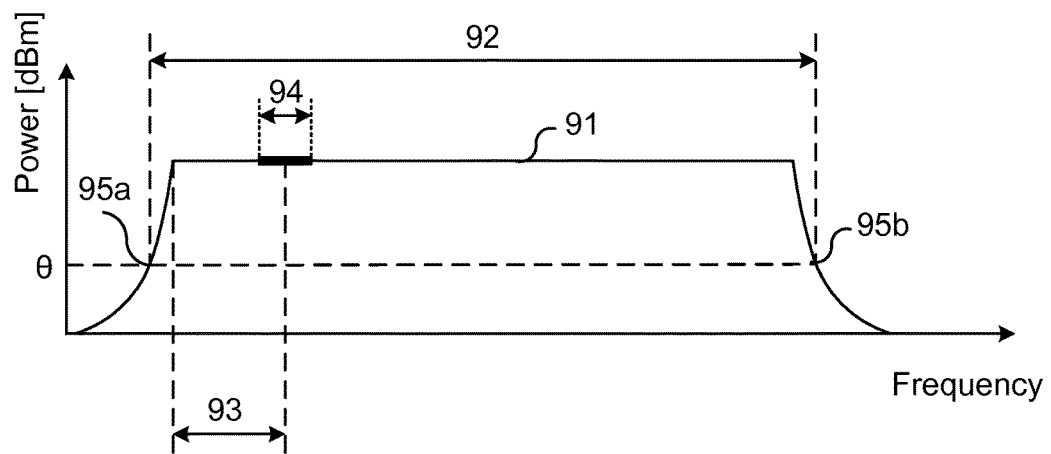
FIG. 9 schematically illustrates received energy as a function of frequency according to a third example.

One example is to define the borders of the frequency interval by a drop in energy. That is, a border may be defined as a point in frequency where the level of the received spectrum drops to a level lower than the level of the interesting spectra. Particularly, according to an embodiment at least one of the first border and the second border is defined by a point in frequency where the level of received energy drops below the threshold value. FIG. 9 provides a schematic example of received level of energy 91 as a function of frequency and where cell search is performed in a sub-band 94 at a frequency distance 93 of a first border 95a of a frequency interval 92 (bounded by the first border 95a and a second border 95b) where the received level of energy is higher than a threshold value θ.

One example is to define the borders of the frequency interval by a neighbouring (but forbidden) cell. That is, a border may be defined as an edge of a modulation spectrum of a detected cell, which cell the wireless terminal 11 is not allowed to camp on. Particularly, according to an embodiment at least one of the first border and the second border is defined by a point in frequency defining an edge of a spectrum of a cell the wireless terminal 11 is forbidden to camp on.

That is, according to one example, one of the borders is defined by a point in frequency where the level of received energy drops below the threshold value whereas the other of the borders is defined by a point in frequency defining an edge of a spectrum of a cell the wireless terminal 11 is forbidden to camp on. According to another example both borders are defined by a respective point in frequency where the level of received energy drops below the threshold value. According to yet another example both borders are defined by a respective point in frequency defining an edge of a spectrum of a cell the wireless terminal 11 is forbidden to camp on.

Reference is now made to FIG. 5 illustrating methods for cell search in a communications network 10 as performed by a wireless terminal 11 according to further embodiments.

According to embodiments the wireless terminal 11 performs initial cell search before performing steps S106 and S108. The steps S106 and S108 may then only be performed in case the initial cell search failed (i.e., in case no cell for the wireless terminal 11 to camp on was found during the initial cell search). Particularly, the wireless terminal 11 may be configured to, in an optional step S102, perform initial cell search based on spectrum matching of a cell at least in the frequency interval. The acquiring (as in S106) and the performing (as in S108) may then only be performed in a case no cell is found during the initial cell search in step S102. Hence, the wireless terminal 11 may, when it has performed a legacy-based initial cell search for a cell selection without detecting any cells that it can camp on (due to e.g. a forbidden PLMN, a cell not being suitable cell, etc.), perform a deeper search on frequencies where energy is received but no cells were detected using the initial cell search.

There may be different ways to determine where to perform the cell search in the sub-band in step S108. Different embodiments relating thereto will now be described in turn.

According to an example the search is started at a distance from one of the borders of the frequency interval. Particularly, according to an embodiment a center of the sub-band is located a distance in frequency from the first border of the frequency interval. According to this embodiment the wireless terminal 11 is configured to, in an optional step S108a, perform the cell search with the sub-band located the distance in frequency from the first border of the frequency interval.

According to an example a cell search is performed at the second border in case no cell was found at the first border. That is, according to an embodiment, the wireless terminal 11 is configured to, in an optional step S108b, and in case a cell is not found in the sub-band located the distance in frequency from the first border of the frequency interval, perform the cell search with the sub-band located the distance in frequency from the second border of the frequency interval.

There may be different ways to define the distance in frequency from the first/second border of the frequency interval. Different embodiments relating thereto will now be described in turn.

The wireless terminal 11 may start to search for cells in a specific frequency interval centered about half of a selected bandwidth away from the border of the searched frequency interval. Thus according to an embodiment the distance in frequency from the first/second border of the frequency interval is half the bandwidth of a spectrum of a cell as identified by the auxiliary information. That is, the auxiliary information may identify a cell that should be present in the search frequency interval. The auxiliary information may further define the bandwidth of such a cell. The search in step S108a may thus be performed in the frequency interval at half the bandwidth from the first border of the frequency interval. Likewise, the search in step S108b may thus be performed in the frequency interval at half the bandwidth from the second border of the frequency interval.

However, the distance in frequency from the first/second border of the frequency interval may be smaller than the half bandwidth of the cell. For example, if the border of the frequency interval is defined by a known (forbidden) cell, the wireless terminal 11 may start the cell search closer to the border since the cell to be found may have some spectrum overlap with the known cell. Particularly, according to an embodiment where a border is defined by a cell on which the wireless terminal is forbidden to camp on the predetermined distance is smaller than the half bandwidth of a spectrum of a cell as identified by the auxiliary information.

There may be different ways for the wireless terminal 11 to act once a cell has been found. Different embodiments relating thereto will now be described in turn.

For example, the wireless terminal 11 may find a cell to camp on. That is, the wireless terminal 11 may be configured to, in an optional step s108c, find a cell in the sub-band during the cell search by receiving and identifying at least one synchronization signal on a carrier in the sub-band. The at least one synchronization signal may comprise a primary synchronization signal and a secondary synchronization signal, as in LTE. However, there may also be just a single synchronization signal. The wireless terminal 11 may then camp on the found cell. Hence, the wireless terminal 11 may be configured to, in an optional step s108d, camp on the found cell.

However, it may be so that the wireless terminal 11 is forbidden to camp on the found cell. That is, the wireless terminal 11 may be configured to, in an optional step s108e, determine that the wireless terminal 11 is forbidden to camp on the found cell.

There may be different reasons as to why the wireless terminal 11 is forbidden to camp on the found cell. For example, the found cell may belong to an operator other than the operator of the wireless terminal 11. For example, the wireless terminal 11 may not be able to establish a communications link with a certain quality criterion fulfilled (such as quality of service (QoS), bit rate, throughput, or bit error rate) with the found cell.

There may be different ways for the wireless terminal 11 to handle situations where the wireless terminal 11 is forbidden to camp on the found cell. Different embodiments relating thereto will now be described in turn.

For example, if a forbidden cell found the wireless terminal 11 may update at least one border of the searched frequency interval. That is, according to an embodiment the wireless terminal 11 is configured to, in an optional step S108f, and in response to the determining in step S108e, update at least one border of the frequency interval so as to provide an updated frequency interval from which a bandwidth of the found cell is excluded. The wireless terminal 11 may then be configured to, in an optional step S108g, repeat the cell search in step S108 (and optionally also the detection in step S104 and/or the acquiring in step S106) in the updated frequency interval.

For example, the wireless terminal 11 may still be acquire some information from the found cell, although the wireless terminal 11 is not allowed to camp on the cell. For example, the wireless terminal 11 may acquire a neighbour cell list. Such a list may be acquired from a cell belonging to the operator of the wireless terminal 11. That is, according to an embodiment the wireless terminal 11 is configured to, in an optional step S108h, and wherein the found cell belongs to an operator of the wireless terminal 11, acquire a list of available cells from the found cell. The wireless terminal 11 may then be configured to, in an optional step S108j, repeat the cell search in step S108 (and optionally also the detection in step S104 and/or the acquiring in step S106) using the neighbour cell list.

Reference is now made to FIG. 6 illustrating a method for cell search in a communications network 10 as performed by the wireless terminal 11 according to one particular embodiment based on at least some of the embodiments disclosed above.

S202: The wireless terminal 11 is started up.

S204: The wireless terminal 11 performs initial cell search, for example according to a legacy cell search procedure.

S206: It is determined whether a cell on which the wireless terminal 11 may camp on has been found in step s204. If yes, step S208 is entered; and if no, step S210 is entered.

S208: The cell search is terminated.

One way to implement steps S202, S204, S206, and S208 is to perform step S102.

S210: The wireless terminal 11 identifies a chunk (i.e., a frequency interval) of spectrum that is continuous and limited by some frequencies (i.e., borders) where there is lower power and thus a gap to the next chunk of spectra with power.

S212: The wireless terminal 11 identifies the borders of the spectra.

One way to implement steps S210, and S212 is to perform step S104.

S214: The wireless terminal 11 acquires auxiliary information, such as information regarding RATs and BWs.

S216: The wireless terminal 11, based on the auxiliary information, selects a RAT and BW to search for first, e.g. LTE and 10 MHz. The modulation bandwidth of this RAT combination is 9 MHz. Therefore the wireless terminal 11 starts to search around a region 4.5 MHz from the border of the spectra. If nothing is found, it searches 4.5 MHz from the border on the other side of the spectra.

One way to implement steps S214, and S216 is to perform step S106.

S218: The wireless terminal 11 performs cell search in the chunk of spectra based on the selected RAT and BW.

S220: If a cell is found step S222 is entered, and if a cell is not found, step S224 is entered.

S222: If a cell is found but the wireless terminal 11 is not allowed to camp on that cell, step S228 is entered, and if a cell is found which the wireless terminal 11 is allowed to camp on, step S230 is entered.

S224: If there are more RATs (and/or BWs) to search for, step S226 is entered, and if not, step S228 is entered.

S226: The wireless terminal 11 selects another RAT/BW combination and again enters step S218.

S228: The wireless terminal 11 may read the neighbor cell list of the forbidden cell to identify any possible other carriers in this continuous spectrum, or alternatively the wireless terminal may continue to run a cell search with the border defined by the end of the spectrum of the detected cell. If there are more spectral shapes to investigate step S212 is entered, and if not, step S230 is entered.

S230: The cell search is terminated.

One way to implement steps S218, S220, S222, S224, S226, S228, and S23o is to perform step S108.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for cell search in a communications network, the method being performed by a wireless terminal, the method comprising:

detecting a level of energy received in a frequency interval to be higher than a threshold value; and using an initial search strategy to search within the frequency interval for at least one center frequency of a respective one or more cells;

if the initial search strategy found at least one center frequency of the respective one or more cells, then camping on a found cell associated with one of the at least one found center frequencies;

if the initial search strategy did not find at least one center frequency of the respective one or more cells, then using a different search strategy to search for the at least one center frequency of the respective one or more cells, wherein the initial search strategy comprises:
detecting that a spectrum shape and bandwidth of a found portion within the frequency interval matches a nominal spectrum shape and bandwidth associated with at least one radio access technology (RAT) and concluding from said detecting that a center frequency of the found portion within the frequency interval is a center frequency of a found cell; and wherein the different search strategy comprises:
acquiring auxiliary information regarding available cells in the frequency interval based on frequency location and width of the frequency interval; and
performing the cell search in at least a sub-band of the frequency interval using the auxiliary information.

2. The method according to claim 1, wherein the steps of acquiring and performing are performed if a spectrum shape of the frequency interval as a whole fails to match the at least one nominal spectrum shape.

3. The method according to claim 1, wherein the auxiliary information comprises identities of radio access technologies (RATs).

4. The method according to claim 3, wherein the auxiliary information further comprises identities of bandwidths used by cells of the RATs.

5. The method according to claim 1, wherein the frequency interval is confined within a first border and a second border, and wherein at least one of the first border and the second border is defined by a point in frequency where the level of received energy drops below the threshold value.

6. The method according to claim 1, wherein the frequency interval is confined within a first border and a second border, and wherein at least one of the first border and the second border is defined by a point in frequency defining an edge of a spectrum of a cell the wireless terminal is forbidden to camp on.

7. The method according to claim 1, wherein a center of the sub-band is located a distance in frequency from a first border of the frequency interval, and wherein performing the cell search comprises:
performing the cell search with the sub-band located the distance in frequency from the first border of the frequency interval.

8. The method according to claim 7, wherein performing the cell search further comprises, in case a cell is not found in the sub-band located the distance in frequency from the first border of the frequency interval:
performing the cell search with the sub-band located the distance in frequency from a second border of the frequency interval.

9. The method according to claim 7, wherein the distance in frequency is half bandwidth of a spectrum of a cell as identified by the auxiliary information.

10. The method according to claim 7, wherein, in a case the border defined by a cell on which the wireless terminal is forbidden to camp on, the distance in frequency is smaller than half bandwidth of a spectrum of a cell as identified by the auxiliary information.

11. The method according to claim 1, further comprising:
finding a cell in the sub-band during the cell search by receiving and identifying at least one synchronization signal on a carrier in the sub-band.

12. The method according to claim 11, further comprising:
camping on the found cell.

13. The method according to claim 11, further comprising:
determining that the wireless terminal is forbidden to camp on the found cell.

14. The method according to claim 13, further comprising, in response to the determining:
updating at least one border of the frequency interval so as to provide an updated frequency interval from which a bandwidth of the found cell is excluded.

15. The method according to claim 14, further comprising:
repeating the performing in the updated frequency interval.

16. The method according to claim 13, wherein the found cell belongs to an operator of the wireless terminal, the method further comprising, in response to the determining:
acquiring a list of available cells from the found cell.

17. The method according to claim 16, further comprising:
repeating the performing using the neighbour cell list.

18. The method of claim 1, wherein a spectrum shape of the frequency interval includes cells that are overlapping in frequency and performing the cell search comprises searching the cells that are overlapping in frequency.

19. A wireless terminal for cell search in a communications network, the wireless terminal comprising a processing unit, the processing unit being configured to cause the wireless terminal to:
detect a level of energy received in a frequency interval to be higher than a threshold value; and using an initial search strategy to search within the frequency interval for at least one center frequency of a respective one or more cells;

if the initial search strategy found at least one center frequency of the respective one or more cells, then camp on a found cell associated with one of the at least one found center frequencies;

if the initial search strategy did not find at least one center frequency of the respective one or more cells, then use a different search strategy to search for the at least one center frequency of the respective one or more cells, wherein the initial search strategy comprises:
detecting that a spectrum shape and bandwidth of a found portion within the frequency interval matches a nominal spectrum shape and bandwidth associated with at least one radio access technology (RAT) and concluding from said detecting that a center frequency of the found portion within the frequency interval is a center frequency of a found cell; and wherein the different search strategy comprises:
acquiring auxiliary information regarding available cells in the frequency interval based on frequency location and width of the frequency interval; and
performing the cell search in at least a sub-band of the frequency interval using the auxiliary information.

20. A nontransitory computer readable storage medium comprising computer code which, when run on a processing unit of a wireless terminal, causes the wireless terminal to:
- detect a level of energy received in a frequency interval to be higher than a threshold value; and
- use an initial search strategy to search within the frequency interval for at least one center frequency of a respective one or more cells;
- if the initial search strategy found at least one center frequency of the respective one or more cells, then camp on a found cell associated with one of the at least one found center frequencies;
- if the initial search strategy did not find at least one center frequency of the respective one or more cells, then use a different search strategy to search for the at least one center frequency of the respective one or more cells,
- wherein the initial search strategy comprises:
  - detecting that a spectrum shape and bandwidth of a found portion within the frequency interval matches a nominal spectrum shape and bandwidth associated with at least one radio access technology (RAT) and concluding from said detecting that a center frequency of the found portion within the frequency interval is a center frequency of a found cell; and
- wherein the different search strategy comprises:
  - acquiring auxiliary information regarding available cells in the frequency interval based on frequency location and width of the frequency interval; and
  - performing the cell search in at least a sub-band of the frequency interval using the auxiliary information.

* * * * *

UNITED STATES PATENT AND TRADEMARK OFFICE
CERTIFICATE OF CORRECTION

PATENT NO. : 10,284,321 B2  
APPLICATION NO. : 14/427027  
DATED : May 7, 2019  
INVENTOR(S) : Palenius et al.

Page 1 of 1

It is certified that error appears in the above-identified patent and that said Letters Patent is hereby corrected as shown below:

On the Title Page

In Item (72), under "Inventors", in Column 1, Line 1, delete "Barseback (SE);" and insert -- Barsebäck (SE); --, therefor.

In Item (72), under "Inventors", in Column 1, Line 2, delete "Horby (SE);" and insert -- Hörby (SE); --, therefor.

In Item (72), under "Inventors", in Column 1, Line 3, delete "Kavlinge (SE)" and insert -- Kävlinge (SE) --, therefor.

In the Specification

In Column 10, Line 56, delete "S23o" and insert -- S230 --, therefor.

Signed and Sealed this  
Twentieth Day of August, 2019

Andrei Iancu  
*Director of the United States Patent and Trademark Office*